(12) United States Patent
Martin

(10) Patent No.: US 12,461,986 B1
(45) Date of Patent: Nov. 4, 2025

(54) SYSTEMS AND METHODS OF CLIENT-SIDE VIDEO RENDERING

(71) Applicant: Rodd Martin, Elanora Heights (AU)

(72) Inventor: Rodd Martin, Elanora Heights (AU)

(*) Notice: Subject to any disclaimer, the term of this patent is extended or adjusted under 35 U.S.C. 154(b) by 0 days.

(21) Appl. No.: 18/851,502

(22) PCT Filed: Sep. 15, 2023

(86) PCT No.: PCT/AU2023/050895
§ 371 (c)(1),
(2) Date: Sep. 26, 2024

(87) PCT Pub. No.: WO2024/059895
PCT Pub. Date: Mar. 28, 2024

(30) Foreign Application Priority Data

Sep. 23, 2022 (AU) .................................. 2022902755

(51) Int. Cl.
*G06F 16/958* (2019.01)
*G06F 16/955* (2019.01)
*G06F 16/957* (2019.01)

(52) U.S. Cl.
CPC ........ *G06F 16/958* (2019.01); *G06F 16/9566* (2019.01); *G06F 16/9574* (2019.01)

(58) Field of Classification Search
None
See application file for complete search history.

(56) References Cited

U.S. PATENT DOCUMENTS

| | | | | |
|---|---|---|---|---|
| 2003/0033432 A1* | 2/2003 | Simpson | ............... | H04L 67/303 709/246 |
| 2008/0172372 A1* | 7/2008 | Shacham | ............. | G06F 16/958 707/999.005 |

(Continued)

FOREIGN PATENT DOCUMENTS

CA 3120594 A1 8/2020

OTHER PUBLICATIONS

Sajeev et al., "Effective web personalization system based on time and semantic relatedness", Sep. 1, 2016, IEEE, 2016 International Conference on Advances in Computing, Communications and Informatics (ICACCI) (2016, pp. 1390-1396) (Year: 2016).*

(Continued)

*Primary Examiner* — Davoud A Zand
(74) *Attorney, Agent, or Firm* — INNOVATION CAPITAL LAW GROUP, LLP; Vic Lin

(57) ABSTRACT

A system and method for client-side video rendering uses a client device to render personalised content videos in real-time, thus avoiding the cost associated with server-side rendering. The process involves a client device's web browser loading a web page containing a client-side renderer, typically in the form of a JavaScript file. The browser is configured to play videos from a hosting source, while the client-side renderer overlays graphics on the video based on personalised content and a video timeline. The system may also stream videos from hosting to avoid local storage and buffering lag, and it accounts for network latency by synchronising graphics with the video progress. Additionally, the client-side renderer and video timeline configurations can be cached separately, minimising data downloads, and a URL service may be used to resolve URLs while preserving customer data privacy by hosting the web page internally.

16 Claims, 2 Drawing Sheets

(56) References Cited

U.S. PATENT DOCUMENTS

| | | | |
|---|---|---|---|
| 2008/0172373 A1* | 7/2008 | Jenson | H04W 4/02 707/999.005 |
| 2011/0258545 A1 | 10/2011 | Hunter | |
| 2018/0227642 A1 | 8/2018 | Sigvaldason | |
| 2022/0201361 A1 | 6/2022 | Loheide et al. | |

OTHER PUBLICATIONS

International Preliminary Report On Patentability (Chapter II) dated Jul. 29, 2024 from PCT Application No. PCT/AU2023/050895, 5 pages.

International Search Report & Written Opinion dated Dec. 19, 2023 from PCT Application No. PCT/ AU2023/050895, 11 pages.

* cited by examiner

SYSTEMS AND METHODS OF CLIENT-SIDE VIDEO RENDERING

FIELD OF THE INVENTION

This invention relates to a system and method for client-side video rendering which uses a client device to render personalised content videos in real-time, thus avoiding server-side rendering.

BACKGROUND OF THE INVENTION

Personalised videos are increasingly used nowadays as a form of digital marketing. Personalised videos are videos which are either configured according to or include personalised content. As such, each personalised video is rendered differently for each respective customer.

Personalised videos are rendered on servers, typically AWS servers. These personalised videos may be rendered in advance and stored in S3 file storage or alternatively rendered in real-time.

However, third-party video rendering services are computationally expensive. For example, marketing campaigns may require renderings of millions of client specific videos every month for which AWS computation cost would be prohibitively expensive.

Furthermore, real-time rendering could introduce a lag of between 6-11 seconds before a video starts playing which may significantly decrease customer interaction.

The present invention seeks to provide a way which will overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY OF THE DISCLOSURE

There is provided herein a system and method for client-side video rendering that enable client devices to render personalised content videos in real-time, avoiding the need for server-side rendering and associated costs.

The process involves a client device's web browser loading a web page that contains a client-side renderer, typically in the form of a JavaScript file. The web page configures the browser to play videos sourced from video hosting services.

While the video is playing, the client-side renderer overlays graphics on the video. These graphics are customised based on personalised content and timing information related to the video.

The web page may utilise a Canvas element to overlay graphics on top of a video player or display both the video and graphics within the Canvas element.

To prevent buffering lag and account for network latency, the system may stream video directly from video hosting, eliminating the need for storing video on the client device.

The client-side renderer may also use timeframes to determine the position of frames, ensuring that graphics are displayed in sync with video progress, even in the presence of playout delays.

The video timeline timing configuration encodes various graphical effects, each tied to a specific frame position, graphical function, and personalised content parameter.

The client-side renderer can be cached separately from the video timeline timing configuration and graphical functions, minimising data download for the web page.

The system may employ a URL service to resolve a URL for the web page. The URL service may use a customer identifier to retrieve personalised content parameters, allowing for customization without transmitting sensitive customer data to third parties.

In embodiments, the client-side renderer can be set up to adapt the video playback based on user feedback received dynamically, wherein, for example, the client-side renderer has the capability to either switch between video streams or adjust video frame positions in response to user feedback. The client-side renderer may be equipped to access the client device's microphone, capture spoken audio, and utilise speech recognition to extract user feedback from it.

In summary, this system and method enable client devices to render personalised content videos in real-time by overlaying graphics on streaming videos, reducing the need for server-side rendering while ensuring a smooth viewing experience.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 1:
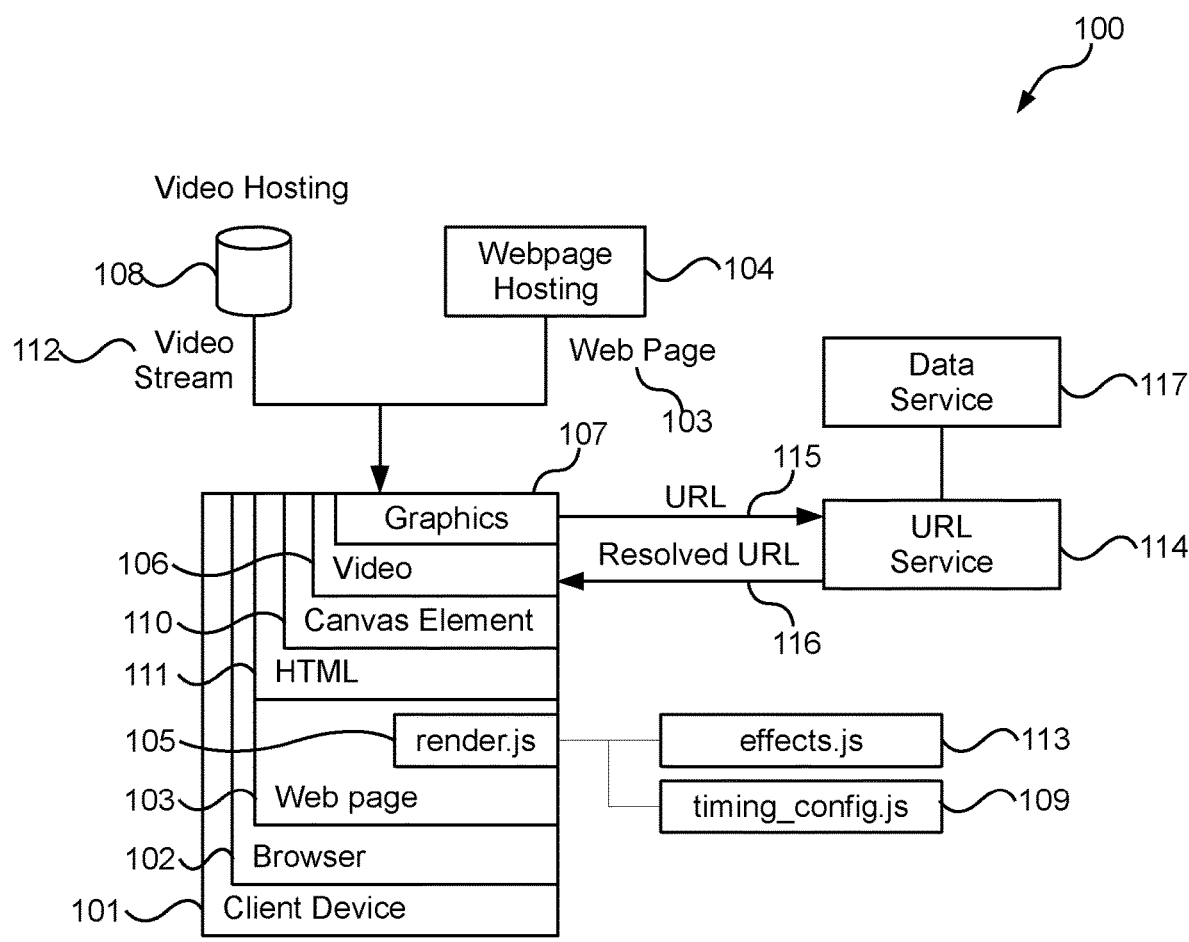
FIG. 1 shows a system for client-side video rendering in accordance with an embodiment.
Figure 2:
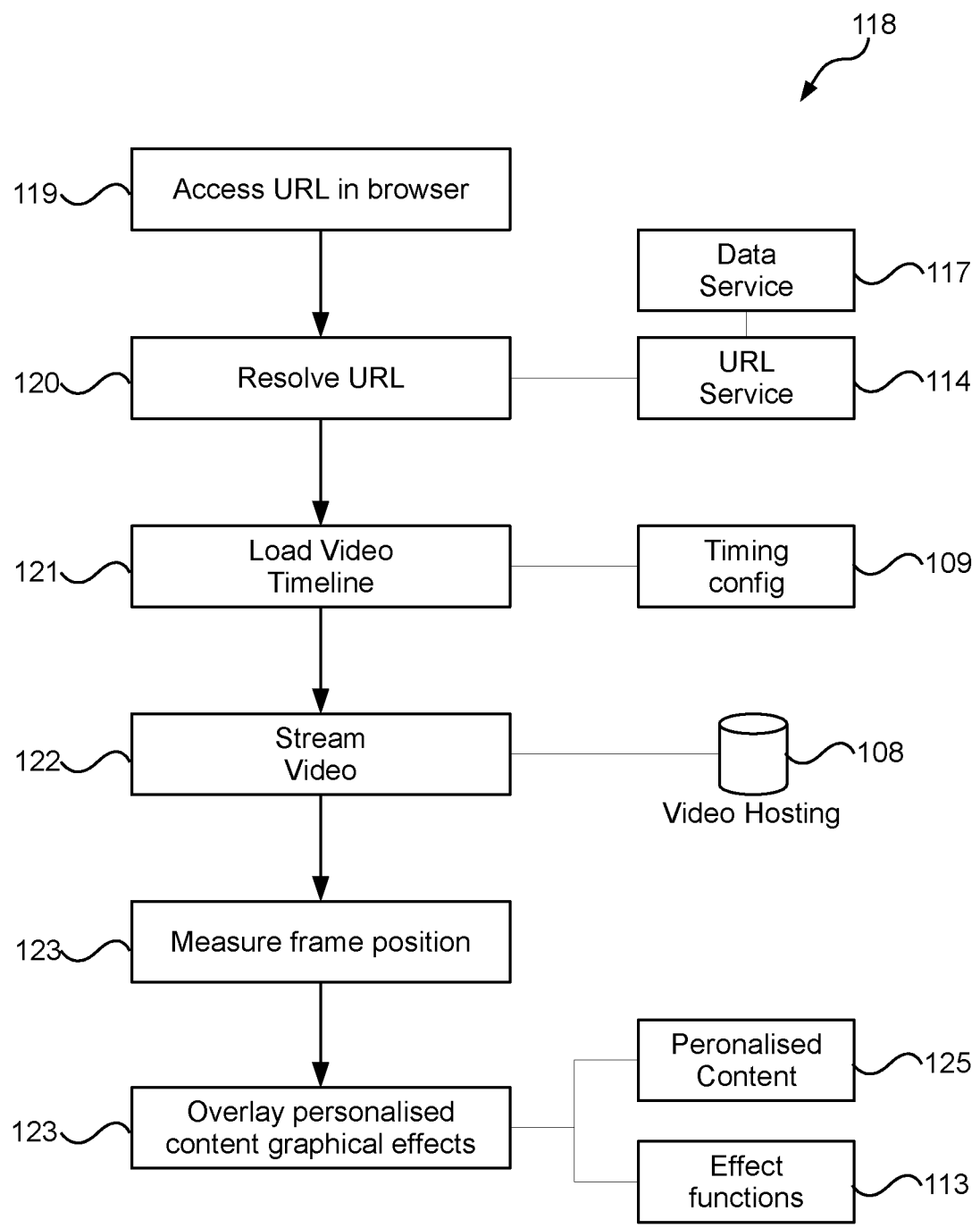
FIG. 2 shows exemplary processing by the system.

FIG. 1 shows a client-side video rendering system 100 in accordance with an embodiment. FIG. 2 illustrates exemplary client-side rendering 118 by the system 100.

The system 100 comprises a client device 101, such as a mobile communication device, personal computer device or the like. The client device 101 comprises a processor for processing digital data.

A memory device in operable communication with the processor is configured for storing digital data including computer program code instructions. In use, the processor fetches these computer program code instructions and associated data for interpretation and execution of the functionality described herein.

The memory device may store software applications including a web browser 102.

The web browser 102 is configured to obtain and render a web page 103 from web page hosting 104.

The web page 104 comprises a client-side renderer 105 shown in FIG. 1 as a JavaScript file referenced by the web page 103.

The browser 103 is configured by the web page 103 to play video 106 obtained from video hosting 108.

The client-side renderer 105 is configured to overlay the video 106 with graphics 107.

Each graphic 107 is configured by the client-side renderer 105 in accordance with personalised content and a video timeline timing configuration 109.

The web page 103 may comprise HTML 111 having a Canvas element 110.

The client-side renderer 105 may use the Canvas element 110 to render the graphics 107.

In one embodiment, the web page 103 comprises a video player element (such as HTML 5 video player element) and wherein the web page 103 overlays the Canvas element 110 over the video player element by controlling the Z-index thereof.

In other embodiments, the Canvas element 110 plays the video 106 and also renders the graphics 107.

In a preferred embodiment, the video 106 is streamed as a video stream 112 from the video hosting 108.

However, to account for network latency video delays, the client-side renderer 105 may be configured to time the graphics 107 according to video progress.

In one embodiment, the client-side renderer is configured to count video frames and render the graphics according to frame position.

Below is exemplary JavaScript code wherein the Canvas element 110 is used to render the video and also count video frames to determine frame position.

```
var canvas=document.getElementById('canvas');
var ctx=canvas.getContext('2d');
var video=document.getElementById('video');
var frameCount=0;
video.addEventListener('play', function( ) {
    var $this=this; //cache
    (function loop( ) {
        if (!$this.paused && !$this.ended) {
            ctx.drawImage($this, 0, 0);
            setTimeout(loop, 1000/30); // drawing at 30 fps
            frameCount++;
        }
    })( );
}, 0);
```

The timing configuration 109 may encode each graphic 107 with a frame position, graphic effect and personalised content parameter.

For example, the timing configuration may comprise the following values:

| Frame position | Graphic function | Content parameter |
|---|---|---|
| 0 | displayText('Welcome $name' 'RED', 'Arial', 12, 15, 80) | 'name' |
| 124 | displayCircle('Black', 20, 50, 50) | null |
| 247 | displayImage('img1.jpg', 20, 20, 40, 80) | null |

Each row may specify a graphical effects function 113 used to display various graphics 107.

According to the above timing configuration 107, and frame position 0, the client-side renderer 105 would use the displayText graphic function to overlay "Hello Shane" in red in Arial size 12 font at anchored at a screen position 15% across and 80% down the Canvas 110.

At frame position 124, the client-side renderer would use the displayCircle graphic function overlay a black circle having a radius of 20 at a screen position [50,50].

An exemplary displayCircle graphic function is shown as follows:

```
functionDisplayCircle(r,x,y) {
    var c=document.getElementById("myCanvas");
    var ctx=c.getContext("2d");
    ctx.beginPath( );
    ctx.arc(x, y, r, 0, 2*Math.PI);
    ctx.stroke( );
}
```

At frame position 247, the client-side renderer 105 would use the displayImage graphic function 113 to overlay a specified image at a screen position 20% across and 50% down the canvas and having a size of 40 pixels by 80 pixels.

In embodiments, the personalised content may comprise audio data which is audibly played by the browser at the specified frame position. In further embodiments, the personalised content may comprise video data (such as lead-in or lead-out video facts) which entirely replaces the display of the video or alternatively is overlaid as a sub-video element therein.

Preferably, the client-side renderer 105 is cached by the browser 102 to reduce load times for subsequent page loads.

In the embodiment shown in FIG. 1, the timing configuration 109 is in a separate JavaScript file as the client-side renderer 105. Furthermore, the graphical effect functions 113 may be in a separate JavaScript file as the client-side renderer 105.

As such, the effects 113 and/or the timing configuration 109 may be video file specific so that the web page 103 only needs to load the graphical effect functions 113 and timing configuration 109 for a specific video file served by the video hosting 108.

The client-side renderer 105 may reference the graphical effect functions 113 and timing configuration 109 to thereby render the graphics 107 for the specific video file accordingly.

In embodiments, the personalised content may be obtained by the browser 102 from URL parameters. For example, such a parameterised URL may comprise:

https://example.com/?name=shane&gender=m

In alternative embodiments, especially where URL parameters may cause a URL to exceed a maximum URL length, the parameters may be encoded in the web page or alternatively separately fetched by the browser 102 by API call. However, it is preferable that the browser 102 obtains the personalised content parameters from the URL or the web page directly to avoid lag when rendering the video 106.

The browser 102 may use a URL service 114 to resolve a web page URL 115 to a resolved URL 116.

The URL service 140 may obtain the personalised content from a data service 117.

For example, the web page URL may comprise a customer identifier wherein the URL service 114 looks up personalised content parameters from the data service 117 using the customer identifier and resolves the URL 115 to a resolved URL 116 wherein the obtained personalised content parameters are parameterised as URL parameters therein.

In alternative embodiments the URL service 114 gets the personalised data as a token which is sent to the resolved URL 116 by the browser 102.

FIG. 2 shows exemplary processing 118 by the system 100.

The processing 118 comprises accessing the URL 115 using the browser 102 at step 119. The URL 115 may encode a customer identifier.

At step 120, the browser 102 may browse to the URL service 115 using the URL 115. The URL service 115 uses the customer identifier encoded in the URL 115 to obtain personalised content parameters from the data service 117. The URL service 114 redirects the browser 102 to the resolved URL 116.

The resolved URL 116 may comprise personalised content parameters encoded as URL parameters therein. Alternatively, the URL service 114 may return the data as a token to the browser 102 and wherein the browser 102 sends the token to the webpage hosting 104 when requesting the resolved URL 116.

At step 121, the client-side renderer 105 loads a video timeline using the timing configuration 109. As alluded to above, the timing configuration 109 may be video file specific.

At step 122, the browser 102 streams the video 106 from the video hosting 108 as a video stream 122.

At step 123, the client-side renderer 105 measures frame positions using the aforedescribed exemplary JavaScript function and wherein, at frame positions specified by the video timeline, the client-side renderer 105 overlays personalised content graphical effects 107 at step 124.

As alluded to above, the graphics 107 may be generated by the client-side renderer 105 using the graphical effect functions 113 and the personalised content 125.

In embodiments, the client-side renderer 105 may collect analytics data and cause the analytics data to be transmitted to a remote server for storage. The analytics data may include device, browser, location, time analytics data and the like.

The analytics data may further comprise analytics data relating to the playing of the video 106. For example, the analytics data may measure when a video 106 has been viewed. A video 106 may be determined by the client-side renderer 105 as having been viewed if the video progresses beyond 5% of the length of the video. As such, when the threshold is met, the client-side renderer 105 may transmit analytics data to the remote server which may aggregate the analytics data to determine the number of times that a video has been viewed.

In embodiments, such analytics data may comprise a video progress metric indicating what proportion of a video 106 has been viewed. The video progress metric may be measured in number of frames or as a percentage calculated by the number of frames displayed in relation to the total number of frames of a video 106.

In embodiments, the client-side-renderer 105 may cache the analytics data in local storage in case the browser is closed before the client-side-renderer 105 is able to transmit the analytics data. The client-side renderer 105 may then query the local storage and transmit the analytics data upon the next instantiation thereof.

In embodiments, the client-side renderer 105 may be configured to dynamically take user input. For example, the client-side renderer 105 may be configured to dynamically display an HTML form at a specified frame position, the form having input fields, such as text input fields, drop-down selection input fields, buttons and the like for the taking of user generated feedback or content in real-time. In embodiments, user generated content may be transmitted to a server for storage.

In embodiments, the client-side renderer 105 may be further configured to dynamically change the display of the video 106 depending on the user feedback. For example, the client-side renderer 105 may be configured to initially play a first video 106 obtained from the video hosting but, depending on the user feedback, such as the user clicking a dynamically display button, the client-side renderer 105 may switch the current video stream 112 to another video stream 112 from the video hosting 108.

In further embodiments, the client-side renderer 105 may skip between frame positions of the video 106 depending on the user feedback.

In embodiments, the client-side renderer 105 may gain access to a client device 101 microphone for the taking of audio instructions using speech recognition.

For example, at a specified frame position, the client-side renderer 105 may be configured to prompt a user for verbal feedback, record audio of such using the microphone and then use speech recognition to recognise speech for the user generated feedback or content. Similarly, the client-side renderer 105 may use this spoken user generated feedback or content to dynamically change the play out of the video.

The foregoing description, for purposes of explanation, used specific nomenclature to provide a thorough understanding of the invention. However, it will be apparent to one skilled in the art that specific details are not required in order to practise the invention. Thus, the foregoing descriptions of specific embodiments of the invention are presented for purposes of illustration and description. They are not intended to be exhaustive or to limit the invention to the precise forms disclosed as obviously many modifications and variations are possible in view of the above teachings. The embodiments were chosen and described in order to best explain the principles of the invention and its practical applications, thereby enabling others skilled in the art to best utilise the invention and various embodiments with various modifications as are suited to the particular use contemplated. It is intended that the following claims and their equivalents define the scope of the invention.

The invention claimed is:

1. Client-side video rendering comprising:
a client device web browser a-obtaining a web page at a URL, the web page preconfigured with:
a client-side renderer; and
timing configuration for a specific video, wherein:
the web page causes the client device web browser to play video obtained from static video hosting; and
the client-side renderer is configured to overlay the video with graphics
generated using graphical functions and personalised content parameters at timings specified by the timing configuration, wherein the client-side renderer is configured to at least one of:
extract the personalised content parameters from URL parameters of the URL; and
asynchronously load the personalised content parameters using a client data service with a URL parameter of the URL.

2. Rendering as claimed in claim 1, wherein the video is streamed by the browser from the video hosting.

3. Rendering as claimed in claim 1, wherein the client-side renderer is configured to time the graphics according to video progress.

4. Rendering as claimed in claim 3, wherein the client-side renderer is configured to count video frames and render the graphics according to frame position.

5. Rendering as claimed in claim 1, wherein the client-side renderer is cached by the browser.

6. Rendering as claimed in claim 1, wherein the timing configuration is cached by the browser.

7. Rendering as claimed in claim 1, wherein the client-side renderer and the timing configuration are separately cached by the browser.

8. Rendering as claimed in claim 1, wherein the graphical functions are cached by the browser.

9. Rendering as claimed in claim 1, wherein the client-side renderer and the graphical functions are separately cached by the browser.

10. Rendering as claimed in claim 9, wherein the graphical functions are video file specific.

11. Rendering as claimed in claim 1, wherein a URL service operably interfaces a client data service to obtain the personalised content parameters.

12. Rendering as claimed in claim 11, wherein the URL service fetches the personalised content as a token.

13. Rendering as claimed in claim 12, wherein the browser sends the token to a URL resolved by the URL service.

14. Rendering as claimed in claim 1, wherein the client-side renderer is configured to dynamically take user feedback and to alter playing of the video dependent on the user feedback.

15. Rendering as claimed in claim 14, wherein the client-side renderer is configured to at least one of switch between video streams and jump video frame positions dependent on the user feedback.

16. Rendering as claimed in claim 14, wherein the client-side renderer is configured to gain access to a microphone of the client device, obtain spoken audio using the microphone and use speech recognition to derive the user feedback.

\* \* \* \* \*